(12) United States Patent
Musko

(10) Patent No.: US 8,995,631 B2
(45) Date of Patent: *Mar. 31, 2015

(54) CORRELATING CALL DETAIL RECORDS WITH TELEPHONY SWITCH INFORMATION

(71) Applicant: AT&T Intellectual Property I, L.P., Atlanta, GA (US)

(72) Inventor: Matthew Musko, Acworth, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 22 days.

This patent is subject to a terminal disclaimer.

(21) Appl. No.: 13/930,186

(22) Filed: Jun. 28, 2013

(65) Prior Publication Data

US 2013/0287191 A1 Oct. 31, 2013

Related U.S. Application Data

(63) Continuation of application No. 12/181,720, filed on Jul. 29, 2008, now Pat. No. 8,483,370.

(51) Int. Cl.
*H04M 15/00* (2006.01)

(52) U.S. Cl.
CPC ............. *H04M 15/41* (2013.01); *H04M 15/00* (2013.01); *H04M 15/53* (2013.01); *H04M 2215/0164* (2013.01); *H04M 2215/0172* (2013.01); *H04Q 2213/1313* (2013.01); *H04Q 2213/13349* (2013.01); *H04Q 2213/13353* (2013.01)
USPC .................. 379/112.06; 379/121.04; 379/133; 379/137

(58) Field of Classification Search
USPC ............... 379/112.06–112.1, 121.04, 121.05, 379/126, 133, 134; 707/999.102
See application file for complete search history.

(56) References Cited

U.S. PATENT DOCUMENTS

2006/0112133 A1 5/2006 Ljubicich et al.
2008/0317237 A1 12/2008 Lozano et al.

*Primary Examiner* — Md S Elahee
(74) *Attorney, Agent, or Firm* — Cantor Colburn LLP

(57) ABSTRACT

A method for processing a non-normalized local exchange routing guide (LERG) table to produce a normalized LERG table. The LERG tables have an NPA field, an NXX field, a Block_Id field, and a Switch_Id field. The method includes joining all distinct combinations of NPA and NXX in the non-normalized LERG table to all valid Block Ids to produce a NormLERG table. The method further includes populating a Switch Id field, in each NormLERG record having a distinct NPA-NXX value. The populating of the Switch_Id field is based on a number of corresponding non-normalized LERG records and on the Switch_Id field in one of the corresponding non-normalized LERG records and on a number of distinct Switch ID values in the corresponding non-normalized LERG records. Each of the corresponding non-normalized LERG records has a same one of the NPA-NXX values.

20 Claims, 10 Drawing Sheets

360

| CALL_ID | START_TIME | END_TIME | CALLING NUMBER | | | | CALLED NUMBER | | | |
|---|---|---|---|---|---|---|---|---|---|---|
| | | | NPA | NXX | BLOCK_ID | SUB | NPA | NXX | BLOCK_ID | SUB |
| 234661 | 00:14:23 | 00:17:56 | 770 | 396 | 3 | 242 | 770 | 587 | 1 | 771 |
| 234661 | 00:57:34 | 02:03:21 | 770 | 476 | 4 | 225 | 404 | 978 | 5 | 215 |
| 234661 | 00:14:23 | 00:17:56 | 404 | 928 | 2 | 081 | 770 | 587 | 1 | 771 |

330

| NPA | NXX | BLOCK_ID | SWITCH_ID |
|---|---|---|---|
| 770 | 396 | 6 | BLS_DWDY |
| 770 | 396 | 3 | NXT_ATL_1 |
| 770 | 396 | 5 | NXT_ATL_2 |
| 770 | 476 | 4 | BLS_DLTH |
| 770 | 587 | 1 | VRZ_ATL_1 |
| 404 | 928 | 2 | BLS_CHBL |
| 404 | 978 | 5 | VRZ_ATL_2 |

380

| CALL_ID | START TIME | END TIME | CALLING NUMBER | | | | | CALLED NUMBER | | | |
|---|---|---|---|---|---|---|---|---|---|---|---|
| | | | NPA | NXX | BLOCK_ID | SWITCH_ID | SUB | NPA | NXX | BLOCK_ID | SUB |
| 234661 | 00:14:23 | 00:17:56 | 770 | 396 | 3 | NXT_ATL_1 | 242 | 770 | 587 | 1 | 771 |
| 234661 | 00:57:34 | 02:03:21 | 770 | 476 | 4 | BLS_DLTH | 225 | 404 | 978 | 5 | 215 |
| 234661 | 00:14:23 | 00:17:56 | 404 | 928 | 2 | BLS_CHBL | 081 | 770 | 587 | 1 | 771 |

395

| CALL_ID | START TIME | END TIME | CALLING NUMBER | | | | | CALLED NUMBER | | | | |
|---|---|---|---|---|---|---|---|---|---|---|---|---|
| | | | NPA | NXX | BLOCK_ID | SWITCH_ID | SUB | NPA | NXX | BLOCK_ID | SWITCH_ID | SUB |
| 234661 | 00:14:23 | 00:17:56 | 770 | 396 | 3 | NXT_ATL_1 | 242 | 770 | 587 | 1 | VRZ_ATL_1 | 771 |
| 234661 | 00:57:34 | 02:03:21 | 770 | 476 | 4 | BLS_DLTH | 225 | 404 | 978 | 5 | VRZ_ATL_2 | 215 |
| 234661 | 00:14:23 | 00:17:56 | 404 | 928 | 2 | BLS_CHBL | 081 | 770 | 587 | 1 | VRZ_ATL_1 | 771 |

FIG. 4

CORRELATING CALL DETAIL RECORDS WITH TELEPHONY SWITCH INFORMATION

CROSS-REFERENCE TO RELATED APPLICATIONS

This application is a continuation of U.S. patent application Ser. No. 12/181,720, filed Jul. 29, 2008, the entire contents of which are incorporated herein by reference.

FIELD OF THE DISCLOSURE

The present disclosure relates to telephony networks, and more specifically, to correlating call detail records with telephony switch information.

BACKGROUND

Various technologies exist which allow telephone service providers to extract information from switching and signaling components in the public switched telephone network (PSTN). This information allows these service providers to determine the current performance of their components and to predict future performance and thus plan for expansion. As one example, information collected from signaling components can be used to generate a call bin report for a telephony switch. A call bin report shows how many hours, and which hours of the day, the trunks on a switch are in use. Network engineers use call bin reports to plan for switch and/or trunk expansion.

Network capacity and network planning reports produced by conventional methods are often inaccurate, due to limitations in the databases used to produce the reports. For example, a local exchange routing guide (LERG) database table is often used in the generation of these reports, to determine which switch and which trunk line is associated with a particular phone number. However, the schema used by a conventional LERG table does not provide a single switch identifier for a phone number. Instead, multiple switch identifiers may be returned when a phone number is queried, resulting in inaccurate call bin counts. Thus, a need arises for these and other problems to be addressed.

SUMMARY

Embodiments of the present invention include a method for processing a non-normalized local exchange routing guide (LERG) table to produce a normalized LERG table. The LERG tables have an NPA field, an NXX field, a Block_Id field, and a Switch_Id field. The method includes joining all distinct combinations of NPA and NXX in the non-normalized LERG table to all valid Block Ids to produce a NormLERG table. The method further includes populating a Switch_Id field, in each NormLERG record having a distinct NPA-NXX value. The populating of the Switch_Id field is based on a number of corresponding non-normalized LERG records and on the Switch_Id field in one of the corresponding non-normalized LERG records and on a number of distinct Switch_ID values in the corresponding non-normalized LERG records. Each of the corresponding non-normalized LERG records has a same one of the NPA-NXX values.

Embodiments of the present invention also include computer-readable medium. Stored on the medium is a program for processing a non-normalized local exchange routing guide (LERG) table to produce a normalized LERG table. The LERG tables have an NPA field, an NXX field, a Block_Id field, and a Switch_Id field. The computer-readable medium includes logic for joining distinct combinations of NPA and NXX in the non-normalized LERG table to valid Block Ids to produce a NormLERG table. The computer-readable medium further includes logic for populating a Switch_Id field, in each NormLERG record having a distinct NPA-NXX value. The populating of the Switch_Id field is based on a number of corresponding non-normalized LERG records and on the Switch_Id field in one of the corresponding non-normalized LERG records and on a number of distinct Switch_ID values in the corresponding non-normalized LERG records. Each of the corresponding non-normalized LERG records has a same one of the NPA-NXX values.

Embodiments of the present invention include a system for processing a non-normalized local exchange routing guide (LERG) table to produce a normalized LERG table. The LERG tables have an NPA field, an NXX field, a Block_Id field, and a Switch_Id field. The system includes means for joining distinct combinations of NPA and NXX in the non-normalized LERG table to valid Block_Ids to produce a NormLERG table. The system further includes means for populating a Switch_Id field, in each NormLERG record having a distinct NPA-NXX value. The populating of the Switch_Id field is based on a number of corresponding non-normalized LERG records and on the Switch Id field in one of the corresponding non-normalized LERG records and on a number of distinct Switch_ID values in the corresponding non-normalized LERG records. Each of the corresponding non-normalized LERG records has a same one of the NPA-NXX values.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure

FIG. 4 illustrates the results of the join procedure 370 from FIG. 3.

DETAILED DESCRIPTION

Figure 1:
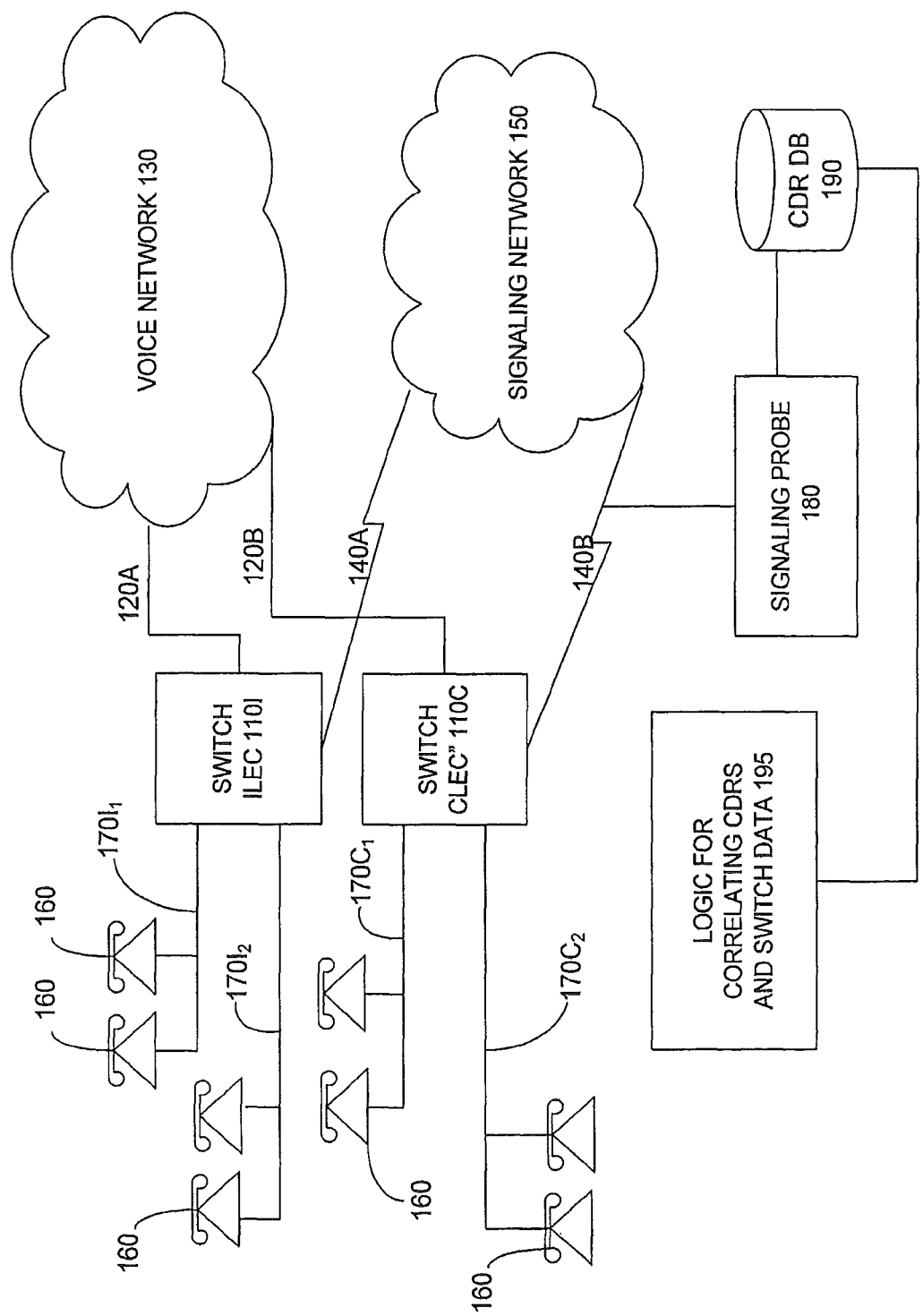
FIG. 1 is a block diagram of an environment in which one embodiment of a system and method for correlating call detail records with telephony switch information is located.

FIG. 1 is a block diagram of an environment in which one embodiment of a system and method for correlating call detail records with telephony switch information is located. Telephony switches 110I and 110C are connected through trunks 120A, B, respectively, to a voice network 130 which carries voice traffic, also known as bearer traffic. The switches 110I and 110C are also connected, through signaling links 140A and B, respectively, to a signaling network 150. In this manner, separate networks are used to carry the bearer portion of the call and the signaling associated with the call. The signaling network 150 is typically implemented as a Signaling System 7 (SS7) network, as should be known to a person of ordinary skill in the art.

A particular switch (110I, 110C) provides telephone service to a set of customers or subscribers. Each telephone 160 is connected to a switch (110I, 110C) by a subscriber loop 170, also known as a local loop 170. Each local loop 170 is assigned a telephone number by the operator of the switch (110I, 110C). Switch operators are often classified as incumbent local exchange carriers (ILECs) or competitive local exchange carriers (CLECs). According to exemplary embodiments, ILECs correspond to traditional phone companies, and the subscriber loops 170 for ILECs are typically twisted wire pairs. According to further embodiments, CLECs correspond to non-traditional phone companies, which may include cable television operators and wireless/cellular/mobile phone companies, so that the subscriber loops 170 for ILECs may be wireless links, coaxial cables, or some other form of communication link.

When calls are made between two telephone endpoints 160, the switches 110I and 110C serving these endpoints exchange signaling messages with each other over the signaling network 150. A signaling link monitor 180, also known as a signaling probe, may monitor call signaling messages along a signaling link such as 140A, 140B. In the example network shown in FIG. 1, the location of the probe 180 allows the probe to monitor calls originating from, or terminated at, the switch 110C, but a person of ordinary skill in the art should understand that the probe 180 may be placed to monitor any switch signaling link.

According to exemplary embodiments, from these monitored messages, the probe 180 is involved in a process which produces call detail records (CDR). The CDRs include information such as call time and duration, calling party, and called party. A person of ordinary skill in the art should be familiar with CDRs and the types of information which may be contained in a CDR. CDRs may be stored in a CDR database 190.

CDRs may be processed and analyzed to produce many different types of reports and studies that are useful to telephony service providers, thus assisting the service providers in areas such as billing verification and settlement, fraud detection, and network planning and engineering. Many of these reports involve identifying the particular switch associated with a telephone number. Logic for correlating call detail records with telephony switch information (195) processes CDRs using an inventive method of mapping telephone numbers to switch identifiers, as will now be described.

Figure 2:
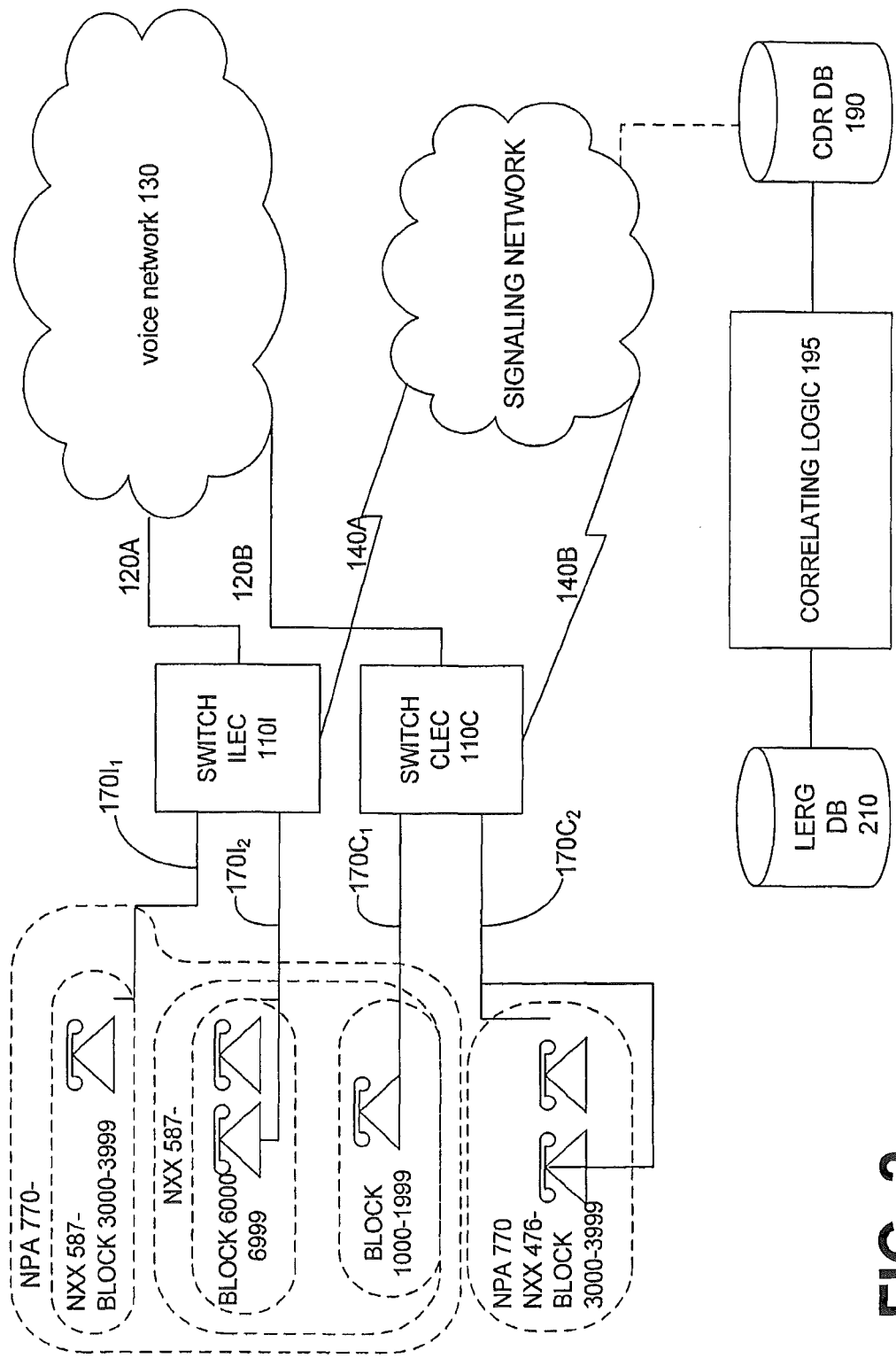
FIG. 2 is another view of the environment from FIG. 1.

FIG. 2 is another view of the environment of FIG. 1, illustrating how telephone numbers are associated with switches in a hierarchical manner. Each local loop 170 is assigned a telephone number by the operator of the switch (110I, 110C). These telephone numbers are organized in a hierarchy, which can be represented as (NPA)-NXX-BSSS: a 3-digit area code or NPA; a 3-digit exchange or NXX; and a subscriber number which includes a 1-digit block identifier B, and 3 additional digits SSS.

In the example environment shown in FIG. 2, the subscribers served by the switch 110I are assigned phone numbers with the same NPA (770) and NXX (587), but the phone numbers are in different blocks: subscribers coupled to switch 110I through the loops 170I.sub.1 have phone numbers in the 3000-3999 block (i.e., block identifier of 3), while subscribers coupled to switch 110I through the loops 170I.sub.2 have phone numbers in the 6000-6999 block.

Another switch (110C) also serves customers with phone numbers in the same NPA-NXX (770-587) as the switch 110I. The switch 110C may be operated, for example, by a CLEC. However, the phone numbers for these customers, on the loop 170C.sub.1, are in a different block (1000-1999). This same switch 110C also serves customers on the loop 170C.sub.2, and these customers have phone numbers with a different exchange (476). Thus, the switch 110C serves customers on two different exchanges (587 and 476), while the switch 110I serves customers on one exchange (587). The switch 110I may be operated, for example, by an ILEC.

In this manner, each NPA-NXX maps to a particular switch 110, and each NPA-NXX-B references one of the ten number blocks available in that NPA-NXX. Each switch 110 has a unique identifier, which in some embodiments is a common language location identifier (CLLI), also known as a CLLI code. A local exchange routing guide (LERG) database 210 stores the mapping between the NPA-NXX-B and the switch identifier, as well as other information about the switch. In some embodiments, the LERG database 210 is controlled by Telcordia, Inc., as will be known by a person of ordinary skill in the art. Such a person should also know that the LERG database 210 contains multiple tables, one of which is a table that contains columns for NPA, NXX, Block_Id, and Switch_Id. In the Telcordia LERG database, this table is referred to as LERG6. A person of ordinary skill in the art should also recognize that the LERG6 may contain additional columns.

As described earlier, CDRs produced by the probe 180 may be used to generate reports or studies. Since the CDR data does not directly identify the switches involved in the call, the CDR data is typically used in conjunction with the LERG6 table of the LERG database 210 to correlate the NPA-NXX of the calling and/or called numbers with a particular switch. However, the conventional method of correlation often produces inaccurate results because of limitations of the LERG database 210. Specifically, the LERG6 table in a conventional LERG database 210 is not normalized. That is, the LERG6 table in a conventional LERG database 210 has NPA, NXX and Block_Id fields, but these fields do not form a primary key. As a result, a query on a particular NPA-NXX-Block_Id combination retrieves records which contain more than one switch identifier, thus producing more records than expected. Therefore, any reports which are generated using such queries are inaccurate.

Disclosed herein are systems and methods for correlating call detail records with telephony switch information, in which a normalized NPA-NXX LERG table is produced from a conventional (non-normalized) LERG6 table. Embodiments of these systems and methods use the normalized NPA-NXX LERG table to correlate CDRs with telephony switch information when generating reports. Specifically, these embodiments use the normalized NPA-NXX LERG table to map the NPA-NXX-Block_Id in a CDR to a switch identifier.

Figure 3:
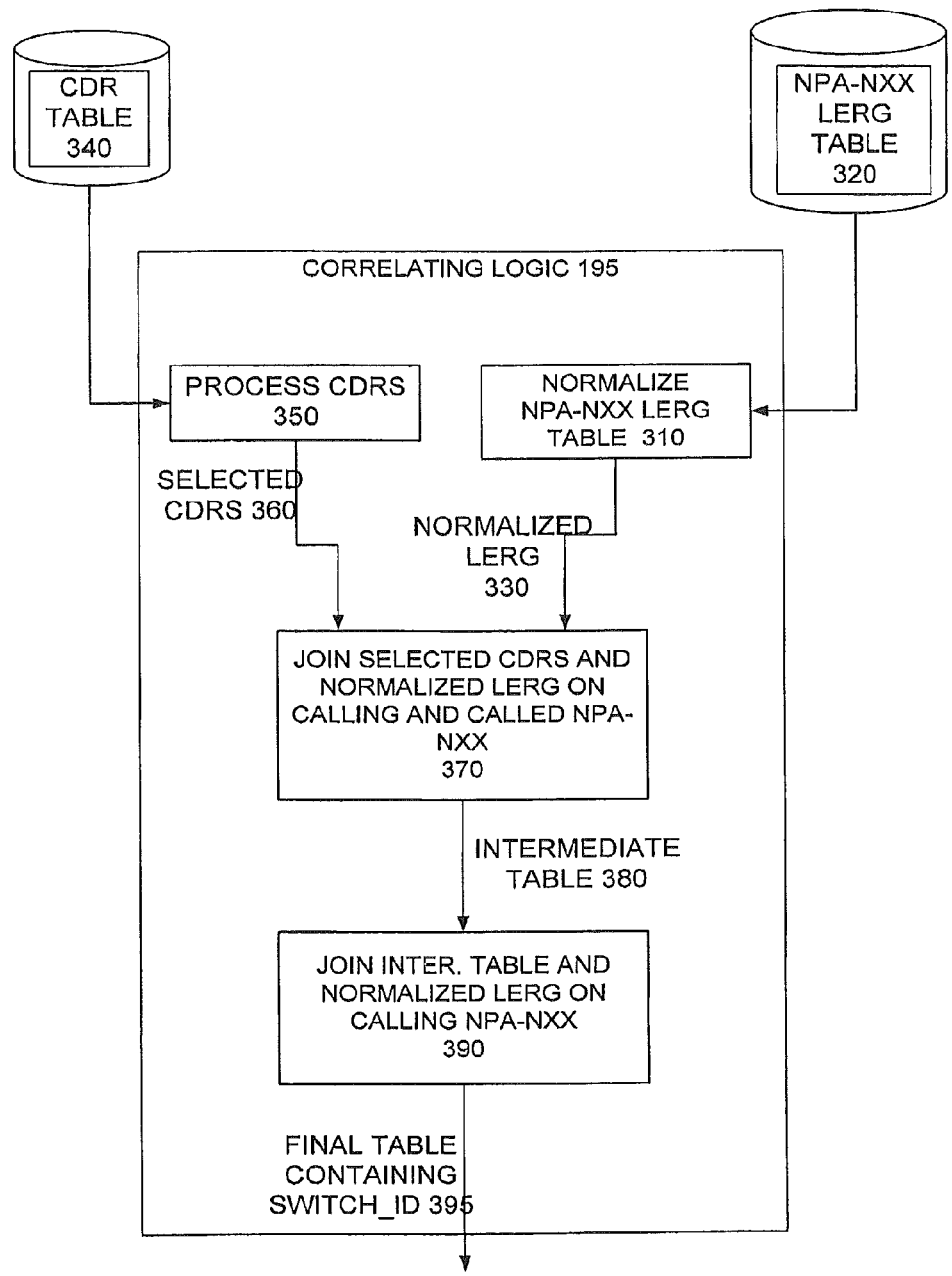
FIG. 3 is a data flow diagram of one embodiment of the logic for correlating call detail records with telephony switch information 195 from FIG. 4.

FIG. 3 is a data flow diagram of one embodiment of the logic for correlating call detail records with telephony switch information 195 from FIG. 1. According to exemplary embodiments, using the LERG database 210 and the CDR database 190 as input, correlating logic 195 produces a CDR table that contains a column for switch identifier. As will be explained below, the format of the input CDRs and the final CDR table may be variable. An exemplary embodiment of correlating logic 195, used to generate switch call bin reports, will be discussed later in connection with FIGS. 4-6.

The correlating logic 195 normalizes (310) the NPA-NXX LERG table 320 in the LERG database 210 to produce a normalized NPA-NXX LERG 330. (The process for normalizing the NPA-NXX LERG will be described later in connection with FIG. 6.) The correlating logic 195 also receives input from a CDR table 340 in the CDR database 190. The records in the CDR table 340 are processed, filtered, or selected (350) to produce a selected CDR record set 360. Many different criteria can be used for selecting CDRs from the CDR table 340, depending on the type of analysis being performed by, or the type of report being generated by, the correlating logic 195. Exemplary criteria include day/time period, calling number, and/or called number.

Next, the normalized NPA-NXX LERG 330 and selected CDR record set 360 are joined (370) on the calling NPA-NXX-Block_Id column (i.e., calling party) as well as the called NPA-NXX column (i.e., the called party). As should be known by a person of ordinary skill in the art, a join of two normalized tables on a particular column creates a new results table, here an intermediate results table 380. The join compares each row in one source table with the rows in the second. For each row in the source table having matching data in the "join on" column, a new row is inserted into the results table. The new row contains columns from both tables.

The results of the join procedure 370 of FIG. 3 can be seen in FIG. 4. In this example, the selected CDR record set 360 is a table with columns for Call_Id, Start_Time, End_Time, Calling_Number_NPA, Calling_Number_NXX, Calling_Number_Block_Id, Calling_Number_Sub, Called_Number_NPA, Called_Number_NXX, Called_Number_Block_Id, and Called_Number_Sub. The normalized NPA-NXX LERG 330 is a table with columns NPA, NXX, Block_Id, and Switch_Id.

The join procedure 370 performs a join operation on the calling NPA-NXX column (i.e., calling party) as well as the called NPA-NXX column (i.e., the called party). The first row in selected CDR record set 360 has a value of "770-396-3" for calling NPA-NXX-Block Id. That value matches the second row of the normalized NPA-NXX LERG 330. The only column present in the normalized NPA-NXX LERG 330 that is not present in the selected CDR record set 360 is the Switch_Id column. Therefore, the first row of the newly formed intermediate results table 380 looks like the first row in the selected CDR record set 360, but also contains a Switch_Id column, with the Switch_Id value ("NXT_ATL.sub.--1") taken from the matching second row of the normalized NPA-NXX LERG 330.

Similarly, the second row in the selected CDR record set 360 has a calling NPA-NXX column value ("770-476-4") that matches the fourth row of the normalized NPA-NXX LERG 330, producing a second row in the intermediate results table 380 having a Switch_Id of "BLS_DLTH". Finally, the third row of the selected CDR record set 360 has a calling NPA-NXX column value ("404-928-2") that matches the sixth row of the normalized NPA-NXX LERG 330, producing a final row in the intermediate results table 380 having a Switch_Id of "BLS_CHBL".

Returning briefly to FIG. 3, the intermediate results table 380 is next joined (390) with the normalized NPA-NXX LERG 330 on the called NPA-NXX-Block_Id column to produce a final CDR table 395. The results of this second join procedure 390 can be seen in FIG. 4. The final CDR table 395 contains a called Switch Id column with values taken from rows in the normalized NPA-NXX LERG 330 that match on the called NPA-NXX-Block_Id in the intermediate results table 380. Thus, the first row of the intermediate results table 380 shows a called NPA-NXX value of "770-587-1" that maps to a Switch Id value of "VRZ_ATL.sub.--1". The second row shows a called NPA-NXX value of "404-978-5" that maps to a Switch_Id value of "VRZ_ATL.sub.--2". Finally, the third row shows a called NPA-NXX value of "770-587-1" that maps to a Switch_Id value of "VRZ_ATL.sub.--1". Therefore, the first row of the final CDR table 395 looks like the first row of the intermediate results table 380, but also contains a Switch Id column associated with the called number with the Switch Id value ("VRZ ATL 1") taken from the matching fifth row of the normalized NPA-NXX LERG 330. Similarly, the second row of the final CDR table 395 looks like the second row of the intermediate results table 380, but also contains a Switch Id column associated with the called number, with the Switch Id value ("VRZ ATL 2") taken from the matching seventh row of the normalized NPA-NXX LERG 330. Also, the third row of the final CDR table 395 looks like the third row of the intermediate results table 380, but also contains a Switch Id column associated with the called number, with the Switch Id value ("VRZ ATL 1") taken from the matching fifth row of the normalized NPA-NXX LERG 330.

Figure 5:
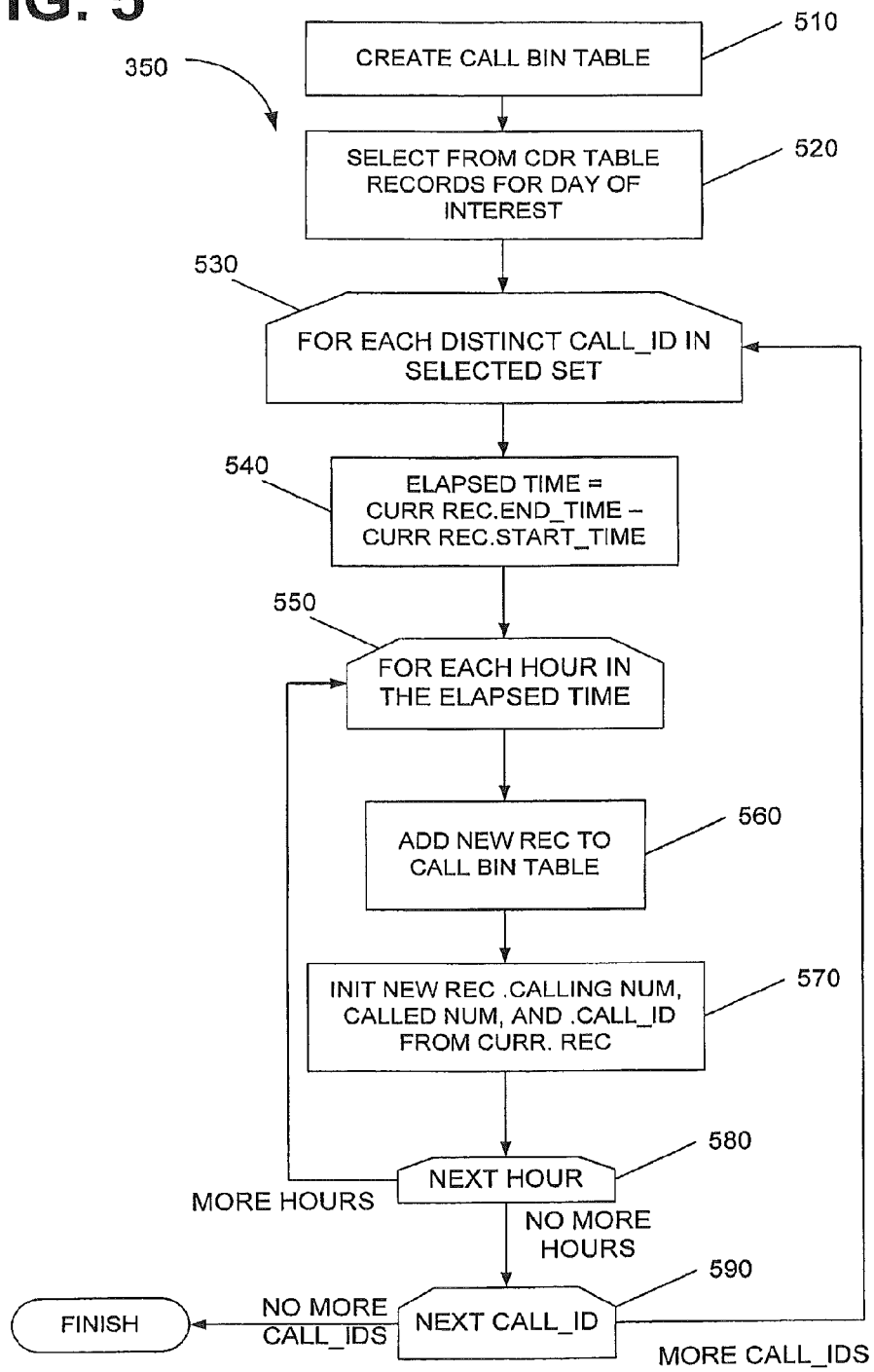
FIG. 5 is a flowchart for a filtering process 350 (from FIG. 3) used in an exemplary embodiment of correlating logic 195 (from FIG. 1) which produces switch capacity, engineering, or network planning reports.

According to exemplary embodiments, the CDR table 340 from which the correlating logic 195 receives input contains specific columns: the call identifier, the start and end times of the call, and the calling number and called number in NPA-NXX-BSSS form. However, the correlating logic 195 can be used with any CDR that includes NPA, NXX, and Block Id for either a calling number or called number. Similarly, the filtering process 350 can use many different criteria to select an initial subset of CDRs for correlation. The correlating logic 195 is therefore useful in a wide variety of CDR processing contexts which have a need to correlate NPA-NXX-Block_Id values with distinct switch identifiers:

FIG. 5 is a flowchart for the filtering process 350 used in an exemplary embodiment of correlating logic 195 which produces switch capacity, engineering, or network planning reports. The process 350 creates a call bin table from selected records in the CDR table 340. This process generates multiple records per call, where each record contains the usage value for each hour that the call duration spanned. For example, if a call starts at 1:58 PM and ends at 2:03 PM, the call bin table contains two records for that call (the 1 PM hour and the 2 PM hour): one record for the 1 PM hour, containing 2 minutes of usage (1:58-2:00 pm); and another record for the 2 PM hour, containing 3 minutes of usage (2:00-2:03). Similarly, if a call starts at 2:17 PM and ends at 2:54 PM, the busy-hour contains one record for that call (the 2 PM hour).

The process 350 starts with block 510, where an empty call bin table is created. At block 520, a subset of records in the CDR table 340 is selected. Since this embodiment produces capacity, engineering or network planning reports, the criteria used for selection is a particular day of interest. In this example embodiment, both the CDR table 340 and the selected CDR record set 360 are similar in format to the shown in FIG. 4, with these columns: Call_Id, Start_Time, End_time, Calling_Number_NPA, Calling_Number_NXX, Calling_Number_Block_Id, Calling_Number_Sub, Called_Number_NPA, Called_Number_NXX, Called_Number_Block_Id, and Called_Number_Sub.

Next, block 530 begins an outer iteration loop for each distinct Call_Id in the CDR record subset. Subsequent blocks in the loop are processed for a current CDR record with a distinct Call_Id. At block 540, the elapsed time of the call is calculated by computing the difference between the End_Time and the Start_Time of the current CDR record. Block 550 begins an inner iteration loop for each hour in the computed elapsed call time. Next, block 560 adds a new record to the call bin table. Block 570 initializes fields in the new record (Call_Id, NPA, NXX, and Block_Id for Calling_Number and Called_Number) from the current CDR record. Block 580 ends the inner iteration loop, moving to the next hour in the elapsed call time, so that blocks 560 and 570 are repeated for each hour.

When all hours in the elapsed call time have been processed, processing moves to block 590, which ends the outer iteration loop. Block 590 moves to the next CDR record with a distinct Call_Id. In this manner, blocks 540-580 are repeated for each distinct Call_Id in the selected CDR record subset. When all CDR records in the subset have been processed, the process is complete.

The filter process 350 of FIG. 5 produces a call bin table containing CDR records which represent those phone numbers within a block handled by a particular switch (or switches) that are busy during a specific hour. However, the call bin table produced by the filter process 350 of FIG. 5 does not directly identify the switch(es). Returning briefly to FIG. 3, the CDR records of the call bin table are then provided as input (360) to the remainder of correlating logic 195 so that the NPA-NXX fields in the call bin table can be correctly mapped to a particular switch identifier.

The functions performed by correlating logic 195 have already been explained in conjunction with FIG. 3. From the provided description, a person of ordinary skill in the art should then understand how the join operations (370 and 390) operate in conjunction with the normalized NPA-NXX LERG 330 to correctly determine the switch identified by the calling number NPA-NXX-Block_Id and the switch identifier by the called number NPA-NXX-Block_Id. In this context, the final CDR table 395 is a call bin table which shows phone numbers, within a block handled by an identified switch, that are busy during a specific time period. A person of ordinary skill in the art should understand how capacity, engineering, or network planning reports can be generated by running queries on this call bin table 395.

A person of ordinary skill in the art should also appreciate that the correlating logic 195 can be used in any CDR processing context which correlates NPA-NXX-Block_Id values with switch identifiers. In contrast, as explained above, conventional methods of correlation are inaccurate because a conventional NPA-NXX LERG (i.e., LERG6) table is not normalized.

As stated above, the correlating logic 195 includes normalizing logic 310 which produces the normalized NPA-NXX LERG 330 from the NPA-NXX table in the non-normalized conventional LERG database 210. The process performed by the normalizing logic 310 will now be described in further detail in connection with the flowchart shown in FIGS. 6A and 6B. Although there are different kinds of LERG tables, when describing the normalization process, the term LERG will be used as shorthand for the NPA-NXX LERG table.

Figure 6A:
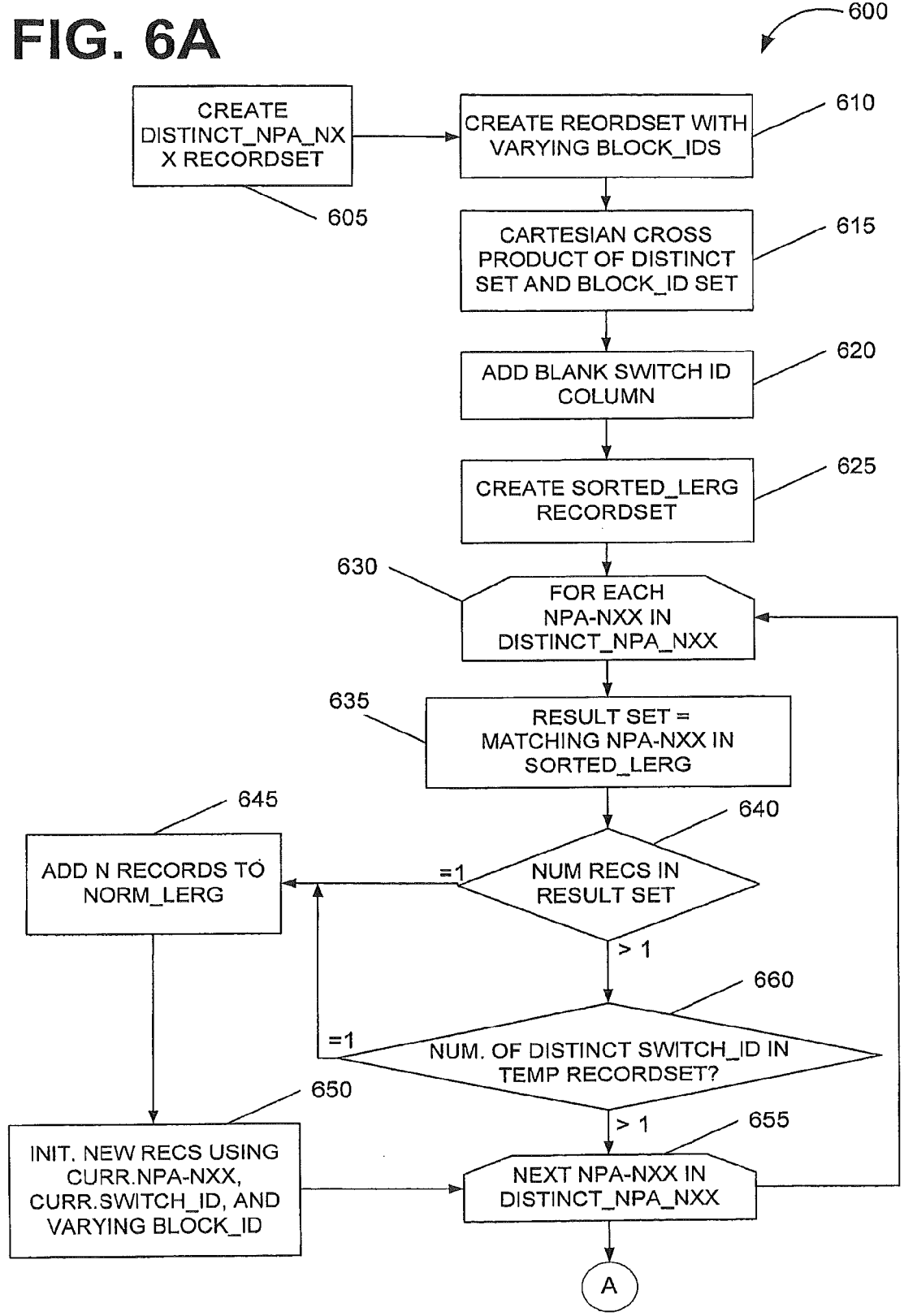
FIGS. 6A-B are a flowchart of the process performed by the normalizing logic 310 from FIG. 3.
Figure 7:
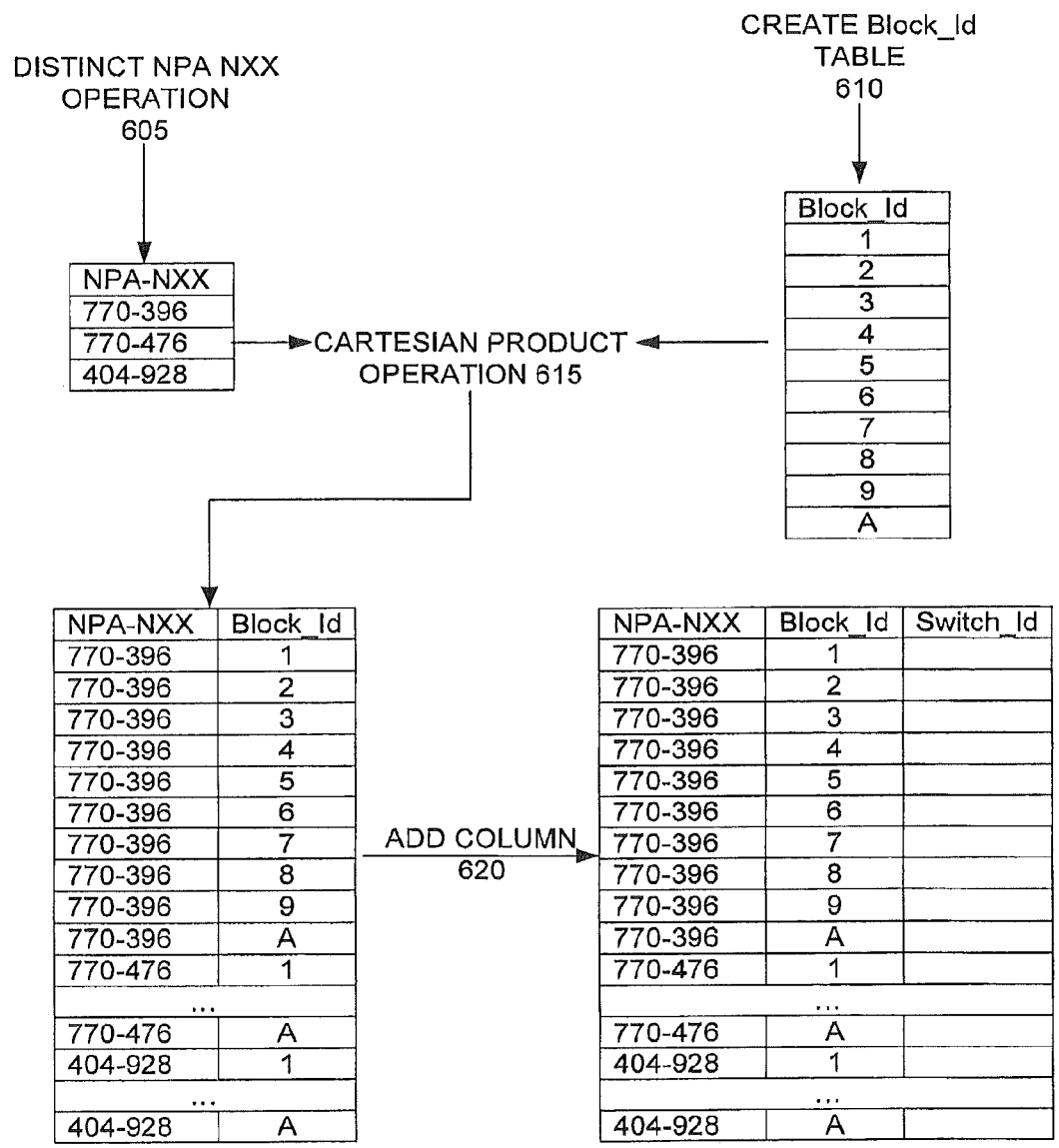
FIG. 7 illustrates the table operations of blocks 605-620 from FIG. 6A.

Turning to FIG. 6A, a normalizing process 600 begins at block 605, where a record set containing every distinct combination of NPA and NXX fields in the non-normalized LERG table is produced, (A person of ordinary skill in the art should be familiar with the use of the DISTINCT operator to produce such a record set.) At block 610, a table is created containing a single column Block_Id, and populated with N rows, with the Block_Id varying from 1 to N, where N is the number of subscriber line blocks. In the embodiments described herein, N is 10, since the North American Numbering Plan divides subscriber numbers into 10 blocks of 1000 each (000-999). At block 615, the Cartesian cross product of the distinct record set (from block 605) and the Block_Id record set (from block 610) is taken. The result is a table containing every distinct NPA NXX BLOCK_ID combination. At block 620, a blank Switch_Id column is added to the table. The table operations in blocks 605-620 are illustrated in FIG. 7.

Returning to FIG. 6A, at block 625, a Sorted LERG table is produced. In one embodiment, the sorted LERG contains these columns: NPA, NXX, Block_Id, Switch_Id, Line_From, Line_To, Effective_Date, and Status. At this point, a blank template for a normalized LERG table (Norm_LERG table) has been created, containing every distinct NPA NXX BLOCK_ID combination, but with Switch_Id uninitialized. The remaining blocks in normalizing process 600 operate to populate this Switch Id field. In populating the Switch_Id field, process 600 queries to produce a result set containing all distinct NPA-NXX records in the non-normalized LERG. Process 600 then populates the Switch_Id field of corresponding non-normalized LERG records (those having the same NPA-NXX value) based on how many of these corresponding non-normalized LERG records are present. In populating the switch field, the process 600 also utilizes the Switch_Id field in one of the corresponding non-normalized LERG records, and a number of distinct Switch_Id values in the corresponding non-normalized LERG records This population process, which occurs in blocks 630-697, will now be described in further detail.

Block 630 begins an iteration loop for each NPA-NXX in the distinct record set, in which the Norm_LERG table will be populated with some number of records using data from the Sorted LERG. Next, at block 635, a result set is created, containing all records in the Sorted LERG (produced by block 625) with a NPA-NXX field that matches the current NPA-NXX. A "result set" can be implemented as a memory resident record set, a variable array, or database table, or a variety of other implementations, as understood by a person of ordinary skill in the art.

At block 640, the number of records in this result set is determined. If only one record exists, then at block 645 the Norm_LERG table is populated with N new records, where N is the number of blocks into which phone numbers are divided. In one embodiment, N is 10, since according to exemplary embodiments, phone numbers are divided into blocks of one thousand (0000-0999, 1000-1999 . . . 9000-9999). Next, at block 650, the new Norm_LERG records are initialized. The values in the NPA, NXX, and Switch_Id fields are the same for each of the N new Norm_LERG records, initialized from the currently iterated distinct LERG record. The Block_Id field is different, with one set to 1, another set to 2, and continuing up to N. After initialization at block 650, block 655 ends the iteration loop, moving to the next distinct NPA-NXX, so that blocks 635-650 are repeated for each distinct NPA-NXX.

If the number of records in the result set is determined by block 640 to be more than one, processing instead continues at block 660, where a distinct evaluation on the Switch_Id field is performed on the result set. If one distinct Switch_Id exists, then blocks 645 and 650 are executed, thus populating the Norm_LERG with N new records, as described above. If more than one distinct Switch_Id exists, then processing continues instead at block 655, where the iteration loop moves to the next distinct NPA-NXX.

Figure 6B:
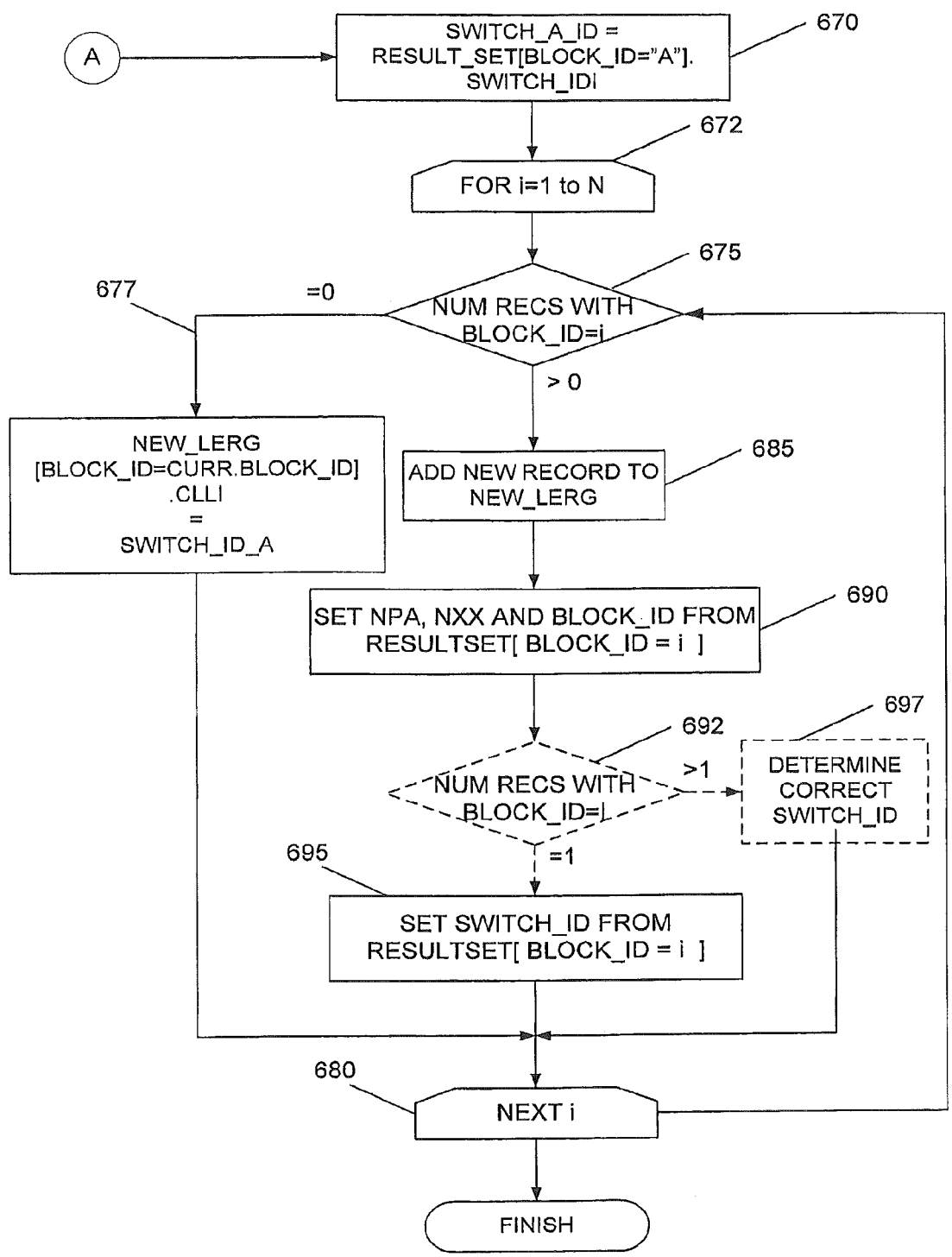

Turning to FIG. 6B, when all distinct NPA-NXX records have been processed, normalizing process 600 continues at block 670, where the switch identifier for Block A in the result set is stored in the variable Switch_A_Id. That is, Switch_A_Id is set to the switch identifier of the record in the result set (produced at block 635) that has a Block_Id value of "A". At block 672, an iteration loop begins, using a loop index I to count from 1 to N. In this loop, the Norm_LERG table will be populated with some number of records using data from the Sorted LERG. Next, at block 675, the number of records in the result set with a Block_Id equal to I is determined.

If the number of records with Block_Id=I is zero (i.e., no switch exists for Block I), then processing continues at block 677, where the switch identifier for Block 0 in the Norm_LERG is set. Block 677 sets the Switch_Id field of the Norm_LERG record with Block_Id=0 to the value of variable Switch_A_Id (from block 655). Processing then continues at block 680, which increments loop index I and continues another iteration starting at block 672. However, when the loop index I reaches N, the normalizing process 600 is finished and control returns to block 560.

If block 675 determines that the number of records with Block_Id=I is non-zero (i.e., a switch does exist for Block I), then processing continues at block 685, where a new record is added to Norm_LERG. At block 690, the NPA, NXX, and Block_Id fields in this new record are initialized from that record in the result set which has a Block_Id equal to loop index I.

The Switch_Id field in the new Norm_LERG record is initialized next. As described above, block 675 determines the number of records with Block_Id equal to I, where block 677 is executed if the number is zero, or block 685 is executed if the number is non-zero. One embodiment of normalizing process 600 assumes that the non-zero number is one (i.e., only one distinct Switch Id record exists for the distinct NPA-NXX-Block being processed). This embodiment initializes the Switch Id field in the new Norm_LERG record at block 695, using the first record in the result set which has a Block_Id equal to loop index 1. Another embodiment allows for more than one distinct Switch_Id record. This alternative embodiment includes two blocks (692 and 697) which are not present in the embodiment that was just described. These optional blocks are shown with dotted lines in FIG. 6B.

This embodiment allows for more than one distinct Switch_Id record by testing again at block 692 for the number of records with Block_Id equal to I. If only one distinct Switch_Id exists, this embodiment initializes the Switch_Id field in the new Norm_LERG record by continuing to block 692. If more than one distinct Switch_Id exists, this embodiment continues at block 697, which determines the proper value for the Switch_Id. (The process by which block 697 determines a proper Switch_Id will be described later in connection with FIG. 8). After setting Switch_Id at block 692 or block 697, processing continues at block 680, which repeats the iteration loop until the loop index I reaches N. At that point, the normalizing process 600 is finished.

Figure 8:
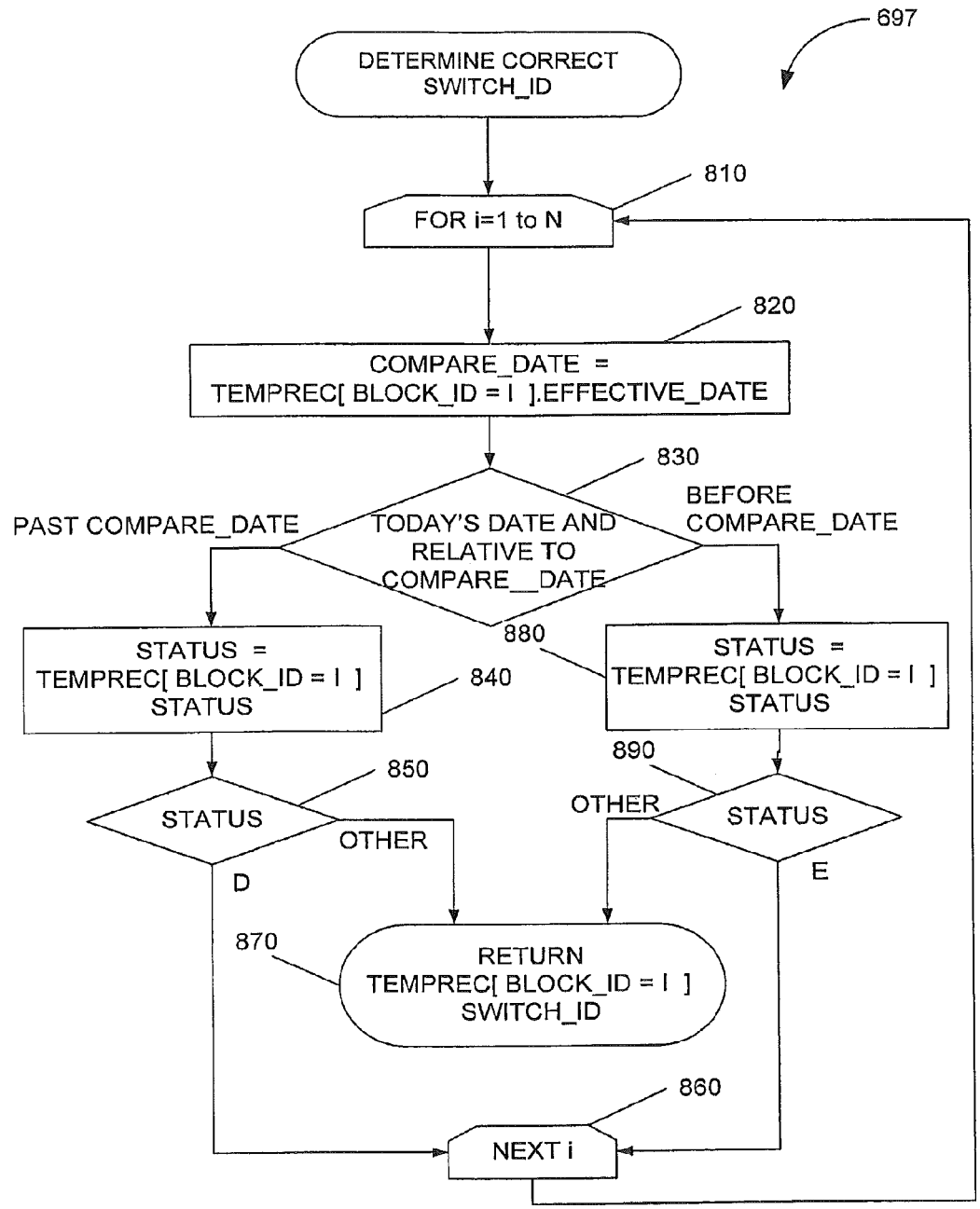
FIG. 8 is a flowchart of the Determine_Switch_Id block 697 from FIG. 6B.

FIG. 8 is a flowchart of the Determine_Switch_Id block 697 from FIG. 6B. The process 800 implemented by the Determine_Switch_Id block 697 handles a scenario where more than one distinct Switch_Id is present, by taking into account the Effective_Date and Status fields of the LERG table. The Status field can have a value of Disconnect or Effective. When Status is Disconnect, then the Switch_Id field is not to be used after the Effective_Date. When the Status is Effective, then the Switch_Id field goes into effect on the Effective_Date.

The process 800 begins with an iteration loop at block 810, using a loop index I to count from 1 to N. At block 820, a variable Comparison_Date is set to the Effective_Date field of the record in the result set which has a Block_Id equal to loop index I. Next, at block 830 the current date is compared to the Comparison_Date. If the current date is past the Comparison_Date, then at block 840 a Status variable is set to the Status field of the record in the result set which has a Block_Id equal to loop index I. Next, at block 850, the Status variable is examined. If Status is Disconnect, then processing continues at block 860, which iterates to the next loop index I. If the Status variable is not Disconnect, then the process 800 completes at block 870, passing a return value to its caller. This return value is equal to the Switch_Id of the record in the result set which has a Block_Id equal to loop index I.

As described earlier, block 830 compares the current date to the variable Comparison_Date. Handling of a current date past the Comparison_Date described earlier. If the current date is before the Comparison_Date, then a Status variable is set to the Status field of the record in the result set which has a Block_Id equal to loop index I at block 880. Next, at block 890, Status variable is examined. If Status is Effective, then processing continues at block 860, moving to the next loop index I. If the Status variable is not Effective, then the process 800 completes at block 870, passing a return value to its caller. This return value is equal to the Switch_Id of the record in the result set which has a Block_Id equal to loop index I.

Figure 9:
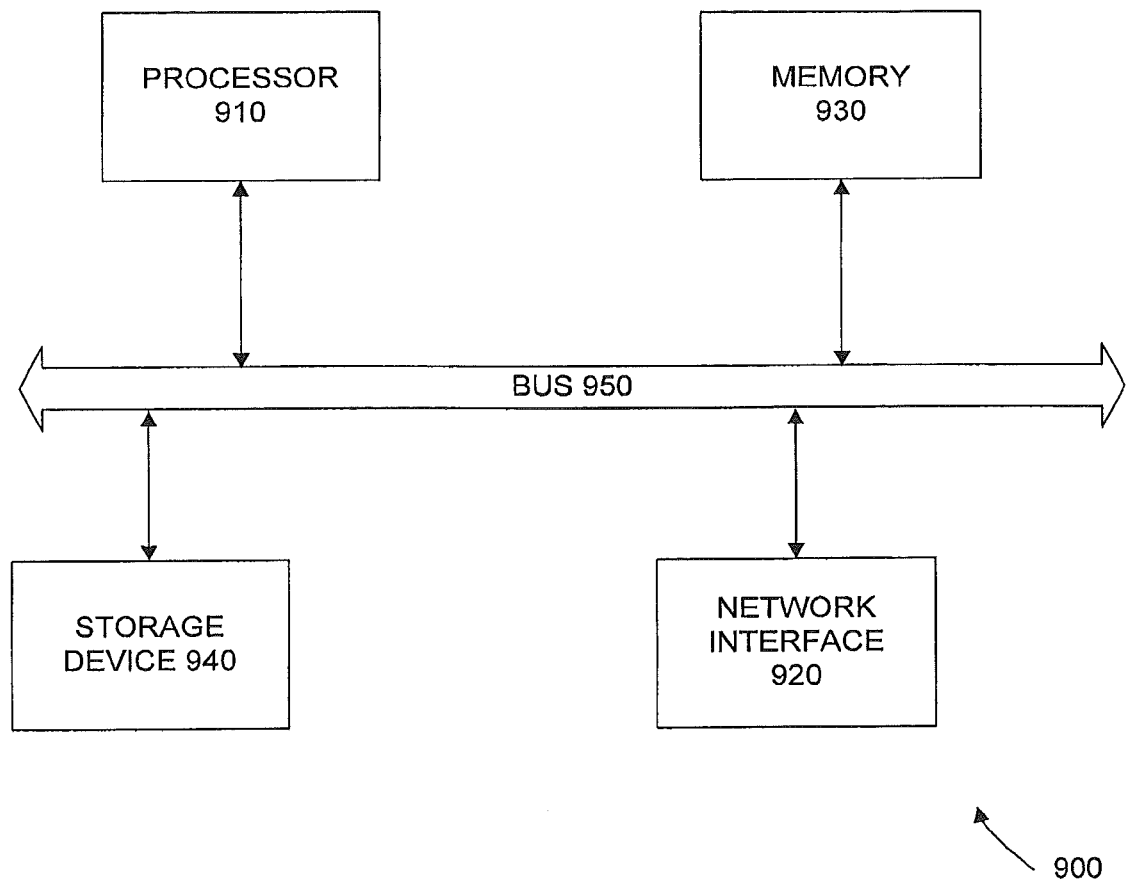
FIG. 9 is a hardware block diagram of a general-purpose computer 900 which can be used to implement various embodiments of the system and method for correlating call detail records with telephony switch information.

FIG. 9 is a hardware block diagram of a general-purpose computer 900 which can be used to implement various embodiments of the system and method for correlating call detail records with telephony switch information. The computer 900 contains a number of components that are well known in the art, including a processor 910, a network interface 920, memory 930, and storage device 940. Examples of the storage device 940 include, for example, a hard disk, flash RAM, flash ROM, and EEPROM. These components are coupled via a bus 950. The memory 930 contains instructions which, when executed by the processor 910, implement the correlating logic 195. Omitted from FIG. 9 are a number of conventional components that are unnecessary to explain the operation of the computer 900.

The systems and methods for displaying electronic mail messages disclosed herein can be implemented in software, hardware, or a combination thereof. In some embodiments, the system and/or method is implemented in software that is stored in a memory and that is executed by a suitable microprocessor (.mu.P) situated in a computing device. However, the systems and methods can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain or store the program for use by, or in connection with, the instruction execution system. The computer readable medium can be based on, for example but not limited to, electronic, magnetic, optical, electromagnetic, infrared, or semiconductor technology.

Specific examples of a computer-readable medium using electronic technology would include (but are not limited to) the following: a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) a portable compact disk read-only memory (CD-ROM). In addition, the functionality could be implemented in logic embodied in hardware or software-configured media.

Any process descriptions or blocks in flowcharts should be understood as representing modules, segments, or portions of code which include one or more executable instructions for implementing specific logical functions or steps in the process. As would be understood by those of ordinary skill in the art of the software development, alternate implementations are also included within the scope of the disclosure. In these alternate implementations, functions may be executed out of order from that shown or discussed, including substantially concurrently or in reverse order, depending on the functionality involved.

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

The invention claimed is:

1. A method for processing a non-normalized local exchange routing guide table to produce a normalized local exchange routing guide table, the non-normalized local exchange routing guide table having a three digit numbering plan area field, an exchange field, a block identification field, and a switch identification field, the method comprising:
   electronically joining all distinct combinations of a numbering plan area and an exchange in the non-normalized local exchange routing guide table to all valid 1-digit block identifications to produce the normalized local exchange routing guide table, wherein each of a plurality of subscriber numbers includes one of the block identifications;
   automatically populating the switch identification field, in each normalized local exchange routing guide record having a distinct combination of the numbering plan area and the exchange, based on a number of corresponding non-normalized local exchange routing guide records, on the switch identification field in one of the corresponding non-normalized local exchange routing guide records, and on a number of distinct switch identification values in the corresponding non-normalized local exchange routing guide records, each of the corresponding non-normalized local exchange routing guide records having a same one of the combinations of the numbering plan area and exchange; and
   electronically accessing call detail records and correlating individual telephone numbers and their usage data to the switch identification values in generating a report showing actual workload of telephony switches;
   wherein the normalized local exchange routing guide table is used to correlate the call detail records with telephony switch information when generating the report.

2. The method of claim 1, further comprising:
   iterating, using a current combination of the numbering plan area and exchange, through all distinct combinations of the numbering plan area and exchange, to populate the switch identification field based on a number of corresponding non-normalized local exchange routing guide records and on the switch identification field in one of the corresponding non-normalized local exchange routing guide records, and on a number of distinct switch identification values in the corresponding non-normalized local exchange routing guide records, each of the corresponding non-normalized local exchange routing guide records having the current combination of the numbering plan area and the exchange.

3. The method of claim 2, wherein the iterating further comprises:
   if a number of local exchange routing guide records having the current combination of the numbering plan area and the exchange is one, populating all records in the normalized local exchange routing guide having the current combination of the numbering plan area and the exchange with the switch identification field from a first non-normalized local exchange routing guide record having the current combination of the numbering plan area and the exchange.

4. The method of claim 2, wherein the iterating further comprises:
   if a number of non-normalized local exchange routing guide records having the current combination of the numbering plan area and the exchange is more than one, populating all records in the normalized local exchange routing guide having the current combination of the numbering plan area and the exchange based on a number of distinct switch identification values in the corresponding non-normalized local exchange routing guide record.

5. The method of claim 2, wherein the iterating further comprises:
   if a number of non-normalized local exchange routing guide records having the current combination of the numbering plan area and the exchange is more than one and a number of distinct switch identification value in the local exchange routing guide records with the current combination of the numbering plan area and the exchange is one, populating all records in the normalized local exchange routing guide having the current combination of the numbering plan area and the exchange with the distinct switch identification value.

6. The method of claim 2, wherein the iterating further comprises:
   if a number of non-normalized local exchange routing guide records having the current combination of the numbering plan area and the exchange is more than one and a number of distinct switch identification value in the local exchange routing guide records with the current combination of the numbering plan area and the exchange is more than one, iterating through all block identification values in the local exchange routing guide records having the current combination of the numbering plan area and the exchange and setting the switch identification value in the normalized local exchange routing guide having the current combination of the numbering plan area and the exchange, the setting based on the current combination of the numbering plan area and th exchange and the iterated block identification value.

7. The method of claim 1, wherein the local exchange routing guide table is a LERG6 table.

8. A computer program product, tangibly embodied on a computer readable medium, for processing a non-normalized local exchange routing guide table to produce a normalized local exchange routing guide table, the local exchange routing guide table having a three digit numbering plan area field, an exchange field, a block identification field, and a switch identification field, the computer program product including instructions that, when executed by a processor, cause the processor to initiate operations comprising:
- joining all distinct combinations of a three digit numbering plan area value and an exchange in the non-normalized local exchange routing guide table to all valid 1-digit block identifications to produce a normalized local exchange routing guide table, wherein each of a plurality of subscriber numbers includes one of the block identifications;
- populating a switch identification field, in each normalized local exchange routing guide record having a distinct combination of the numbering plan area and the exchange, based on a number of corresponding non-normalized local exchange routing guide records and on the switch identification field in one of the corresponding non-normalized local exchange routing guide records and on a number of distinct switch identification values in the corresponding non-normalized local exchange routing guide records, each of the corresponding non-normalized local exchange routing guide records having a same one of the combinations of the numbering plan area and the exchange; and
- electronically accessing call detail records and correlating individual telephone numbers and their usage data to the switch identification values in a report showing actual workload of telephony switches;
- wherein the normalized local exchange routing guide table is used to correlate the call detail records with telephony switch information when generating the report.

9. The computer program product of claim 8, the operations further comprising:
- iterating, using a current combination of the numbering plan area and the exchange, through all distinct combinations of the numbering plan area and the exchange, to populate the switch identification field based on a number of corresponding non-normalized local exchange routing guide records and on the switch identification field in one of the corresponding non-normalized local exchange routing guide records, and on a number of distinct switch identification values in the corresponding non-normalized local exchange routing guide records, each of the corresponding non-normalized local exchange routing guide records having the current combination of the numbering plan area and the exchange.

10. The computer program product of claim 9, wherein the iterating further comprises:
- determining a first number of local exchange routing guide records having the current combination of the numbering plan area and the exchange; and
- populating, if the first number is one, all records in the normalized local exchange routing guide having the current combination of the numbering plan area and the exchange with the switch identification field from a first non-normalized local exchange routing guide record having the current combination of the numbering plan area and the exchange.

11. The computer program product of claim 9, wherein the iterating further comprises:
- determining a first number of non-normalized local exchange routing guide records having the current combination of the numbering plan area and the exchange; and
- populating, if the first number is more than one, all records in the normalized local exchange routing guide having the current combination of the numbering plan area and the exchange based on a number of distinct switch identification values in the corresponding non-normalized local exchange routing guide record.

12. The computer program product of claim 9, wherein the iterating further comprises:
- determining a first number of non-normalized local exchange routing guide records having the current combination of the numbering plan area and the exchange;
- determining a second number of distinct switch identification value in the local exchange routing guide records; and
- populating, if the first and second numbers are one, all records in the normalized local exchange routing guide having the current combination of the numbering plan area and the exchange with the distinct switch identification value.

13. The computer program product of claim 9, wherein the iterating further comprises:
- determining a first number of non-normalized local exchange routing guide records having the current combination of the numbering plan area and the exchange;
- determining a second number of distinct switch identification value in the local exchange routing guide records; and
- iterating, if the first and second numbers are one, through all block identification values in the local exchange routing guide records having the current combination of the numbering plan area and the exchange and setting the switch identification value in the normalized local exchange routing guide having the current combination of the numbering plan area and the exchange, the setting based on the current combination of the numbering plan area and the exchange and the iterated block identification value.

14. The computer program product of claim 8, wherein the local exchange routing guide table is a LERG6 table.

15. A system for processing a non-normalized local exchange routing guide table to produce a normalized local exchange routing guide table, the local exchange routing guide table having a three digit numbering plan area field, an exchange field, a block identification field, and a switch identification field, the system comprising:
- a memory having stored thereon program code; and
- a processor programmed by the program code for initiating operations including:
  - electronically joining all distinct combinations of a numbering plan area and an exchange in the non-normalized local exchange routing guide table to all valid 1-digit block identifications to produce the normalized local exchange routing guide, wherein each of a plurality of subscriber numbers includes one of the block identifications;
  - automatically populating the switch identification field, in each normalized local exchange routing guide record having a distinct combination of the numbering plan area and the exchange, based on a number of corresponding non-normalized local exchange routing guide records and on the switch identification field in one of the corresponding non-normalized local exchange routing guide records and on a number of distinct switch identification values in the corresponding non-normalized local exchange routing guide records, each of the corresponding non-normalized local exchange routing guide records having a same one of the combinations of the numbering plan area and the exchange; and electronically accessing call detail records and correlating individual telephone numbers and their usage data to the switch identification values in a report showing actual workload of telephony switches;

wherein the normalized local exchange routing guide table is used to correlate the call detail records with telephony switch information when generating the report.

16. The system of claim 15, the operations further comprising:
iterating, using a current combination of the numbering plan area and the exchange, through all distinct combinations of the numbering plan area and the exchange, to populate the switch identification field based on a number of corresponding non-normalized local exchange routing guide records and on the switch identification field in one of the corresponding non-normalized local exchange routing guide records, and on a number of distinct switch identification values in the corresponding non-normalized local exchange routing guide records, each of the corresponding non-normalized local exchange routing guide records having the current combination of the numbering plan area and the exchange.

17. The system of claim 16, the iterating further comprises:
if a number of local exchange routing guide records having the current combination of the numbering plan area and the exchange is one, populating all records in the normalized local exchange routing guide having the current combination of the numbering plan area and the exchange with the switch identification field from a first non-normalized local exchange routing guide record having the current combination of the numbering plan area and the exchange.

18. The system of claim 16, the iterating further comprises:
if a number of non-normalized local exchange routing guide records having the current combination of the numbering plan area and the exchange is more than one, populating all records in the normalized local exchange routing guide having the current combination of the numbering plan area and the exchange based on a number of distinct switch identification values in the corresponding non-normalized local exchange routing guide record.

19. The system of claim 16, the iterating further comprises:
if a number of non-normalized local exchange routing guide records having the current combination of the numbering plan area and the exchange is more than one and a number of distinct switch identification in the local exchange routing guide records with the current combination of the numbering plan area and the exchange is one, populating all records in the normalized local exchange routing guide having the current combination of the numbering plan area and the exchange with the distinct switch identification.

20. The system of claim 16, the iterating further comprises:
if a number of non-normalized local exchange routing guide records having the current combination of the numbering plan area and the exchange is more than one and a number of distinct switch identification value in the local exchange routing guide records with the current combination of the numbering plan area and the exchange is more than one, iterating through all block identification values in the local exchange routing guide records having the current combination of the numbering plan area and the exchange and setting the switch identification value in the normalized local exchange routing guide having the current combination of the numbering plan area and the exchange, the setting based on the current combination of the numbering plan area and the exchange and the iterated block identification value.

* * * * *